(12) United States Patent
Scholz et al.

(10) Patent No.: US 7,672,354 B2
(45) Date of Patent: Mar. 2, 2010

(54) ELECTRICALLY EXCITED GAS DISCHARGE LASER FOR GENERATING HIGH-REPETITION FREQUENCY LIGHT PULSES AND METHOD FOR THE PRODUCTION THEREOF

(75) Inventors: Matthias Scholz, Am Mellensee (DE); Johannes Schurack, Berlin (DE); Edgar Spranz, Beimerstetten (DE); Karl Heinz Segsa, Berlin (DE); Joachim Mueller, Ahrensfelde (DE)

(73) Assignee: LTB-Lasertechnik Berlin GmbH, Berlin (DE)

( * ) Notice: Subject to any disclaimer, the term of this patent is extended or adjusted under 35 U.S.C. 154(b) by 42 days.

(21) Appl. No.: 11/914,651

(22) PCT Filed: May 23, 2006

(86) PCT No.: PCT/DE2006/000919
§ 371 (c)(1),
(2), (4) Date: Jul. 7, 2008

(87) PCT Pub. No.: WO2006/125433
PCT Pub. Date: Nov. 30, 2006

(65) Prior Publication Data
US 2008/0279247 A1 Nov. 13, 2008

(30) Foreign Application Priority Data
May 23, 2005 (DE) .................... 10 2005 024 931

(51) Int. Cl.
*H01S 3/22* (2006.01)
(52) U.S. Cl. .......................... 372/58; 372/61
(58) Field of Classification Search ............... 372/55, 372/54, 57; 438/22
See application file for complete search history.

(56) References Cited

U.S. PATENT DOCUMENTS 3,696,307 A * 10/1972 Beaulieu et al. .......... 372/38.05
(Continued)

FOREIGN PATENT DOCUMENTS

DE 2811198 2/1979
(Continued)

OTHER PUBLICATIONS

Iehisa n. et al: "Sealed-off Co2 Laser with In-Au Alloy Sealing" Review of Scientific Instruments, AIP, Melville, NY, US, vol. 57, No. 2, Feb. 1986, pp. 299-300, XP000712034, ISSN: 0034-6748.
(Continued)

*Primary Examiner*—Minsun Harvey
*Assistant Examiner*—Tuan N. Nguyen
(74) *Attorney, Agent, or Firm*—Darby & Darby (57) ABSTRACT

A transversally electrically excited gas discharge laser for generating light pulses with a high pulse repetition rate. The gas discharge laser has components include a gas-tight discharge tube with opposed wall passages and front ends. The discharge tube includes ceramic material with laser gas sealed therein. The components also include partial metal layers disposed on the discharge tube. Decoupling and holding elements including support trays are disposed in the wall passages, with the support trays being adhered with solder to the discharge tube via the partial metal layers. The components also include a pair of electrodes extending axially and disposed in the decoupling and holding elements so as to form a gas discharge path. The components also include a pair of rod-shaped electrodes disposed in the discharge tube that are substantially parallel to the main electrodes and operable to control the starting conditions of gas discharge. The electrical excitation circuit includes a switch to generate a high-current discharge from an energy storage device. Support rings are joined to the front ends of the discharge tube and a pair of optical resonator mirrors are welded into the support rings. At least some of the components are usable with an ultrahigh vacuum and heatable to above a second water boundary. The support trays and the support rings are deformable so as to enable fine adjustment of the main electrodes and of the resonator mirrors.

20 Claims, 2 Drawing Sheets

U.S. PATENT DOCUMENTS

| | | | |
|---|---|---|---|
| 4,223,279 A * | 9/1980 | Bradford et al. | 372/86 |
| 4,613,971 A | 9/1986 | Brumme et al. | |
| 4,807,839 A | 2/1989 | Nettleton et al. | |
| 4,953,174 A | 8/1990 | Eldridge et al. | |
| 5,430,753 A * | 7/1995 | Welsch et al. | 372/87 |

FOREIGN PATENT DOCUMENTS

| | | |
|---|---|---|
| DE | 8025354 | 2/1984 |
| DE | 3313811 | 10/1984 |
| DE | 3619354 | 1/1987 |
| DE | 261466 | 10/1988 |
| DE | 3734690 | 4/1989 |
| DE | 4010149 | 10/1991 |
| DE | 4127566 | 3/1992 |
| DE | 4408041 | 9/1995 |
| DE | 29520820 | 4/1996 |
| DE | 29713755 | 9/1997 |
| DE | 20212624 | 11/2002 |
| DE | 10147655 | 4/2003 |
| EP | 0585482 | 3/1994 |
| GB | 2177846 | 1/1987 |
| JP | 61201488 | 9/1986 |

OTHER PUBLICATIONS

APS-ALLTEC Power Switch, ALLTECs ALLMARK A, May 18, 2005, p. 1 of 1, Relevance of document to be found in specification.

Grekhov I. et al., "High Power Semiconductor-Based Nano and Subnanosecond Pulse Generator with a Low Delay Time", Ioffe Institute RAS, PPC-2003, Dallas; 3 pages.

Frost C. A., "Multi-kilovolt Solid State Picosecond Switch Studies", IEEE 2002, pp. 174-177.

Engelko A. et al., "Simulation of Semiconductor Opening Switch Physics", IEEE 2002, pp. 318-321.

* cited by examiner

ELECTRICALLY EXCITED GAS DISCHARGE LASER FOR GENERATING HIGH-REPETITION FREQUENCY LIGHT PULSES AND METHOD FOR THE PRODUCTION THEREOF

CROSS REFERENCE TO RELATED APPLICATIONS

This is a U.S. National Phase application under 35 U.S.C. §371 of International Application No. PCT/DE2006/000919, filed on May 23, 2006, and claims the benefit of German Patent Application No. 10 2005 024 913.0, filed on May 23, 2005. The International Application was published in German on Nov. 30, 2006 as WO 2006/125433 A1 under PCT Article 221(2).

FIELD

The invention relates to a transversally electrically excited gas discharge laser for generating light pulses having a high pulse repetition rate.

BACKGROUND

Transversally excited gas discharge lasers, especially transversally electrically excited lasers—TEA (Transverse Electrical discharge in gas at Atmospheric pressure) lasers—have been known since the mid-70s. These lasers stand out for a number of properties that are particularly important for various applications: very high laser output power with an adjustable magnitude and course, high beam quality, high operating safety, good controllability, compact construction and high quantum-optical efficiency. The gas discharge lasers have a broad application spectrum, among other things, as an excitation source in laser-induced, time-resolved spectroscopy, for intensity-dependent absorption and fluorescence examinations, as a test light source for electronic components and modules, as a source of ionization light in time-of-flight spectroscopy, for the opto-acoustic surface diagnostics of extremely thin layers, as a tool in micromaterial processing and for numerous applications under a UV microscope. The important aspect for many applications is especially the high pulse repetition rate with light pulses in the nanosecond and sub-nanosecond ranges.

The active laser cavity of a gas discharge laser consists of the height, the distance and the length of the main electrodes; this is where the stimulated light amplification takes place. The laser-active material is in the form of a gas or a gas mixture or vapor. The gas discharge can be excited optically or electrically. Popular gas lasers include $CO_2$ lasers having a wavelength of 10.6 μm (far-infrared), for instance, for material processing, HeNe lasers having a wavelength of 633 nm (red), for example, for measuring technology, and excimer lasers having a wavelength ranging from 157 nm to 351 nm (ultraviolet, 157 nm F2, 31 nm XeF), for instance, for measuring technology and photochemistry. Mention should also be made of nitrogen lasers, which exhibit all of the prerequisites to become a significant and cost-effective UV source at 337.1 nm and at a bandwidth of 100 pm. The wavelength of 337.1 nm is ideal for many applications. Important methods that have been adopted worldwide are based on this wavelength. The active laser medium, nitrogen, does not require any laborious preparation for the operation of the laser. No chemical compounds are formed that would burden the environment. The physical characteristics of the laser allow the generation of very short light pulses ranging from a few nanoseconds to a few 100 ps without any complicated additional equipment. The use of excimer gas mixtures is likewise possible, also when halogen gases are involved.

The energy feed needed to amplify the light is obtained by means of a high-current discharge of 1000 to 3000 A cm$^{-2}$ through the entire active laser cavity. The high-current discharge causes most of the gas molecules of the laser medium to be brought into a higher-energy excited state. A randomly occurring photon of the same direction and wavelength or a fed-in oscillator photon then starts the amplification process. The light wave runs between the two resonator mirrors until most of the gas molecules are no longer in the laser-active excited state. Part of the light energy is outcoupled via the output coupler and is then available as a monochromatic, oriented light pulse. The high-current discharge is fed from low-inductivity capacitors in which the requisite electric energy is temporarily stored during the time span between the laser pulses. The temporarily stored energy is conducted into the laser cavity via a heavy-duty circuit-breaker at a rate of current rise ranging from 100 to 500 kAµ$^{-1}$.

There are gas discharge lasers in various versions in terms of their essential components, namely, the laser channel and the excitation circuit. The laser channel is arranged in a discharge vessel in which the gas discharge path is located, and it usually consists of two main electrodes situated across from each other and having an overall length of 10 mm to 500 mm. There are gas discharge lasers with an external gas reservoir (German patent application DE 41 27 566 A1) as well as gas discharge lasers with a gas cavity that is sealed-off in the discharge vessel and that is cooled by passive or active circulation. In many gas discharge lasers, a first problem is encountered with the gas-tightness of the gas discharge vessel. German utility model DE 295 20 820 U1 describes a laser tube for gas discharge lasers containing halogen in which all of the openings are sealed off by interposed metal gaskets. German utility model DE 297 13 755 U1 describes a gas discharge laser with a ceramic gas discharge tube in which the metal gaskets have an elastic core. German patent application DE 40 10 149 A1 describes a high-frequency excited strip conductor laser in which the resonator mirror is connected galvanically directly to the main electrodes. German patent application DE 101 47 655 A1 describes a gas discharge laser in which an insulator is provided that largely encloses the gas discharge chamber and that is configured as a single piece in order to save on gaskets. German utility model DE 202 12 624 U1 describes a compact excimer laser for generating high pulse rates in which a main electrode is arranged in a ceramic discharge tube, with the main electrode forming the gas discharge path leading to several heat exchanger tubes. The front ends of the discharge tube are sealed off by two flanges, with interposed gaskets. In addition to a pre-ionizer, several current formers and a fan are arranged in the discharge tube. Several larger ionization capacitors are provided on the outside of the discharge vessel as part of the discharge circuit. German patent application De 36 19 354 A1 describes a transversally excited pulse gas laser that has radially adjustable main electrodes, which requires an asymmetrical construction.

In addition to the laser channel with the discharge vessel and the main electrodes, the electrical excitation circuit may also play a role in a gas discharge laser when it comes to achieving a high current discharge between the main electrodes. Generally, the electrical excitation circuit consists of at least two capacitors, the main electrodes, a fast switch, for example, a spark gap or thyratron, as well as ribbon cables for fast and low-loss energy transmission. German utility model G 80 25 354 U1 describes a high-energy laser of the TEA type with pre-ionization rods arranged parallel to the laser axis, whereby the pulse-forming electrical excitation circuit can be configured as a Blümlein circuit or as a charge-transfer circuit. With the Blümlein circuit, the high voltage is applied to a first charging capacitor via a low-inductivity switch. Parallel to this is the series connection of a second charging capacitor and the gas discharge path. The basic circuit diagram of the Blümlein circuit is shown in German patent application DE 44 08 041 A1 for a sub-nanosecond nitrogen laser. The charge-transfer circuit differs from the Blümlein circuit especially in that the second charging capacitor lies parallel to the gas discharge path and in that the first charging capacitor is connected in series to the low-inductivity switch and thus to the high-voltage supply. Therefore, with the charge-transfer circuit, only switching pulses of up to about 1 ns with a pulse rise time of the switch of about 40 ns are possible, in contrast to which the Blümlein circuit can generate pulses of up to 50 ps at a switch rise time of less than 12 ns. The product brochure titled "ALLTEC Power Switch" of the ALLTEC company describes the use of a semiconductor switch for operating the high-voltage discharge of TEA $CO_2$ lasers. This can replace conventional thyristors but still has similarly large dimensions within the range of a few 100 mm.

In order to obtain a laser discharge with a uniform volume while avoiding the formation of an electric arc at high gas pressures, it is advantageous to attain an initial concentration of ions and electrons in the gas discharge path prior to applying the electric main pulse. This technique is referred to as pre-ionization and is described in German patent application 28 11 198 A1. One way to achieve a pre-ionization includes using the characteristic Blümlein voltage pre-pulse that is formed at the main electrodes during the charging cycle of the Blümlein transmission line. The amplitude of this fast pulse is sufficiently large so that an initial disturbance of electrons in the vicinity of the main electrodes is achieved. It is, however, also sufficiently short so that a complete breakdown of the laser gas is prevented. The magnitude and time behavior of the pre-pulse are controlled by the pulse-charging rate of the Blümlein transmission line and can be changed over a wide range of values so that optimal pre-ionization is achieved. The high-current discharge is applied directly to the auxiliary electrodes in order to achieve a pre-ionization and via the contact electrodes on the outside of the discharge vessel on the main electrodes. German patent application DE 37 34 690 A1 describes a procedure to use a contact electrode on the outside of the discharge vessel as a capacitor electrode.

DE 33 13 811 A1 is a gas discharge laser with the above-mentioned components that has a cylindrical, gas-tight (sealed-off) discharge vessel, for instance, made of ceramic aluminum oxide $Al_2O_3$ that is sealed off at both ends by resonator mirrors, with interposed gaskets. Between each pair of electrodes, the pre-ionization is brought about outside of the gas discharge path. The main electrodes are mushroom-shaped and are secured by means of decoupled supports and feed lines that pass through the vessel wall and are connected to the excitation circuit. The excitation circuit has, in addition to a capacitor connected in parallel to a gas discharge path, also a triggerable spark gap and is likewise connected to main and auxiliary electrodes. No statements are made about the adjustment possibilities of the main electrodes and of the resonator mirrors. Such a gas discharge laser, however, entails several drawbacks, as a result of which it is difficult to condition. These drawbacks include the fact that the static and dynamic service life of the gas is limited due to leaks that occur at the joints on the discharge vessel and due to the relatively high diffusion rates of the individual components. Moreover, since these lasers typically cannot be heated to temperatures very much above 100° C., it becomes very time consuming (approximately 24 hours) to create the requisite hygienic conditions for the gas in the discharge vessel, especially with respect to the dipolar water residues that inevitably lead to aggressive compounds containing laser-gas components that can render the laser non-operational, in addition to which the gas has to be purged several times. The switch in the excitation circuit and the discharge channel are modules that are subject to wear and tear. A standby power source has to be provided. The external construction elements give rise to losses and the need for additional resources. Finally, the gas discharge laser displays a time jitter, a temperature gradient and especially a tolerance zone for the optical interface owing to adjustment inaccuracies during the production of the laser and to errors in the readjustment possibilities during operation.

SUMMARY

In an embodiment, the present invention provides a transversally electrically excited gas discharge laser for generating light pulses with a high pulse repetition rate. The gas discharge laser includes components that include a gas-tight discharge tube having diametrically opposed wall passages and front ends. The discharge tube has a laser gas sealingly disposed therein and includes a ceramic material. The components also include partial metal layers disposed on the discharge tube. Decoupling and holding elements including support trays are disposed in the wall passages, with the support trays being adhered with solder to a circumference of the discharge tube via the partial metal layers. The components also include a pair of main electrodes extending axially and disposed in the decoupling and holding elements so as to form a gas discharge path in the discharge tube. The components also include a pair of rod-shaped auxiliary electrodes disposed in the discharge tube that are substantially parallel to the main electrodes and operable to control the starting conditions of gas discharge by electronic pre-ionization. The components also include at least one energy storage device and an electrical excitation circuit operable to act on the main and auxiliary electrodes, the electrical excitation circuit including a switch operable to generate a fast high-current discharge from the energy storage device. Support rings are joined to the front ends of the discharge tube and a pair of optical resonator mirrors are welded into the support rings and disposed on the front ends of the discharge tube in an axial orientation relative to the gas discharge path. A first of the optical resonator mirrors is partially permeable so as to provide light outcoupling. At least some of the components are usable with an ultrahigh vacuum and heatable to above a second water boundary, and the support trays and the support rings are deformable so as to enable fine adjustment of the main electrodes and of the resonator mirrors.

BRIEF DESCRIPTION OF THE DRAWINGS

Exemplary embodiments of a gas discharge laser and a production method according to the invention will be described in greater detail below with reference to the schematic figures, in which.

DETAILED DESCRIPTION

An aspect of the present invention is to provide a gas discharge laser of the type described above which can be conditioned easily and reliably. Preferably, the laser of the invention does not exhibit any leaks and only entails very low diffusion rates, thus attaining a high static and dynamic service life for the gas. In particular, preferably no water residues are present in the finished gas discharge laser. Instead it may be possible to remove such residues in a simple, fast and reliable manner. Finally, the gas discharge laser according to the invention may be configured such that it does not display any tolerance zone of the optical interface since it can be adjustable with a high degree of precision both immediately after its production and during operation. In an embodiment, the inventive achievement of the envisaged objective of attaining improved laser conditioning can be gleaned from the invention described in detail below.

In an exemplary embodiment, the gas discharge laser includes the following components:
- a gas-tight discharge tube made of a ceramic material and having a sealed filling of laser gas,
- two main electrodes extending axially which are arranged in decoupling and holding elements provided in diametrically opposed wall passages of the discharge tube so as to form a gas discharge path in the discharge tube,
- a rod-shaped auxiliary electrode extending parallel to the main electrodes in the discharge tube for purposes of controlling the starting conditions for the gas discharge in the discharge tube through electronic pre-ionization.
- an electrical excitation circuit that acts upon the main electrodes and the auxiliary electrodes and that comprises a switch, for purposes of generating a fast high-current discharge fed from energy storage devices,
- two optical resonator mirrors on the front ends of the discharge tube in an axial orientation relative to the gas discharge path, whereby one resonator mirror is configured so as to be partially permeable for purposes of light outcoupling, and the invention relates to a method for the production of such a gas discharge laser.

An embodiment of the gas discharge laser according to the invention may include a substantially monolithic discharge tube with a sealed-off gas reservoir, whereby the functional components of the laser combine to fulfill the mechanical, gas-related, electrical and optical requirements that are made of a laser head, said components being wear and maintenance-free and entailing low losses. For this purpose, both front ends of the discharge tube, without any detachable connections or gaskets, may be joined to support rings—into which the optical resonator mirrors are welded—and the circumference of said discharge tube is joined to the support trays by adhesive force provided by molten hard solder that is connected to partial metal layers that have been correspondingly applied onto the discharge tube. All of the functional components of the single-piece laser head may be fit for use with ultrahigh vacuum and consequently only exhibit very low diffusion rates. The dynamic and static (gas) service life of discharge vessels, however, is primarily determined by their diffusion rate, whose influence increases as the gas volume in the discharge vessel becomes smaller. In this context, the main problem so far has been the gaskets (organic special materials or soft-annealed metal gaskets) that, as a rule, consist of several elements pressed together. The discharge tube of the gas discharge laser according to the invention, however, does not have any gaskets so that the leakage that is inevitably encountered with gaskets is avoided altogether. Furthermore, the diffusion properties of the materials of all of the involved components are selected in such a way that the composition of the laser gas remains uncritical over a very long period of time and the gas discharge laser according to the invention has a long service life and can generate several 100 million light pulses without the need for maintenance.

Moreover, the materials of the components of the gas discharge laser according to the invention may be selected such that they meet all of the requirements of ultrahigh vacuum technology and permit heating up above the second water boundary (355° C.). Above the second water boundary, any water dipoles that still remain after the water evaporates above 100° C. and that cling to the inner wall of the discharge vessel may be reliably dissolved and removed. Consequently, after the discharge vessel has been heated up above the second water boundary, its interior is completely free of water. This reliably precludes any damage due to remaining water. Thus, the discharge vessel can be filled with various gases, including halogen gas mixtures, in the pressure range from $10^4$ Pa to $6 \times 10^5$ Pa bar, and can be operated maintenance-free over a prolonged period of time.

The hard-solder connection by adhesive force is achieved by a hard soldering process during production. The soldering process to join all of the components may be carried out above 900° C. The different coefficients of thermal expansion of the components hinder (or else they make the joining process extremely expensive) reproducibility of the adjustment precisions of a few hundredths and angular precisions of <0.1° during the production of the gas discharge laser. A simple production process may be selected for the gas discharge laser according to the invention and a possibility is created for fine adjustment and readjustment once the gas discharge laser is in its finished state. This possibility lies in the fact that the main electrodes are held in support trays and are mechanically decoupled; the extension of these support trays—precisely like the support rings for the mirror resonators—can be defined by a permanent plastic deformation or fixed elastic deformation in such a way that the generated laser pulse beam is optimally focused and positioned. As a result, the production work becomes more favorable. The temperature gradient of the gas discharge laser is determined by the discharge tube and therefore may be negligible. The support trays and support rings can all be used to easily carry out readjustments during operation.

In embodiments of the gas discharge laser according to the invention, it can be advantageous to configure one or both main electrodes to be blade-like and/or to have several adjacent openings that are designed in such a way that the webs around the openings have a constant width. The discharge current is then conducted and deflected along these webs. Furthermore, the two main electrodes can be of different heights and the gas discharge path can be arranged outside of the longitudinal axis of the discharge tube. This asymmetrical electrode geometry with passage openings allows a passive or—alternatively, if appropriate components such as blower elements are employed in the openings—an active gas circulation in the discharge tube with a particularly positive effect on the repetition rate and on the stability of the gas discharge laser that can be achieved while concurrently reducing the deposition rates on the optical resonator mirrors. A stable laser operation is achieved, even at high pulse repetition rates. In conjunction with the gas-tight joining technology, the described electrode geometry allows an especially low-inductivity feed of the main discharge. As a result, the gas discharge laser according to the invention can be used to generate light pulses of up to 50 ps. Further optimization of the individual components is aimed at generating light pulses having a duration of 50 ps. During the gas discharge, the current may not be applied continuously to the rounded electrode edges, but rather, can be pinched off like a filament through the plasma. This results in very high current loads (>1000 Acm$^2$) at the contact sites, which can cause an evaporation of the electrode material, for instance, copper, at the electrode edges. The resultant metal vapor can precipitate adversely on the resonator mirrors and can lower the transmission of the optical component. Accordingly, it may be advantageous to have a high-melting coating on the two main electrodes in the area of the gas discharge path. The metal vapor pressure generated during operation is extremely reduced by such a coating. At the same time, the coating can reduce the absorption of gas molecules into the electrode surfaces (getters).

The shape of the discharge vessel in the claimed gas discharge laser permits an independent control of the starting conditions for the gas discharge. Consequently, a separate electronic pre-ionization can take place that allows virtually wear-free operation. The service life achieved is three to five times greater than with other gas discharge lasers. Therefore, other embodiments of the gas discharge laser according to the invention propose that—at the height of the upper edge of a main electrode facing the gas discharge path—both rod-shaped auxiliary electrodes be affixed to two support pins as decoupling and holding elements in wall holes located in the discharge tube.

In an embodiment the gas discharge laser of the present invention can be controlled by an especially low-inductivity, coaxial excitation circuit that encloses the discharge vessel and contains all of the electrical components used for energy storage, for fast energy transmission as well as the switch. In this context, the electrical excitation circuit can be advantageously configured as a Blümlein circuit having several strip conductor capacitors which coaxially enclose the discharge tube. A homogeneous, arc-free discharge is needed in order to obtain an optimal electrical excitation. For purposes of compensating for potentially detrimental magnetic fields (inductivities), the current paths ("current surfaces") can be diametrically opposed (180°) to each other in the strip conductor capacitors. Accordingly the requisite current rise from 100 to 500 kAµs$^{-1}$ (typically 300 A/ns) can be reached in conjunction with the integrated semiconductor switches. With the coaxial arrangement, the strip conductor capacitors can be integrated into a strip conductor that coaxially encloses the discharge tube and also holds at least one semiconductor switch or else can be directly applied on other partial metal layers on the outside of the discharge tube. As a rule, voltage-proof insulating materials such as polyimide films or ceramic films are used for the strip conductors. Their high dielectric strength (a few 10 kV) and an $\epsilon_R$ ranging from 5 to 300 allow the construction of strip conductor modules with a surge impedance in the ohm range. As a result, ultra short light pulses of up to 50 ps can be generated. Furthermore, the high-current discharge can be switched via at least one miniaturized, directly switching semiconductor switch that is integrated between the strip conductor capacitors. In an embodiment, the semiconductor switch is a direct-action, high-performance switching element on a semiconductor basis. Such high-performance switching elements are cited, for example, in the publications "High power semiconductor-based nano and subnanosecond pulse generator with a low delay time" (I. Grekhov et al., PPC-2003, Dallas), "Multi-kilovolt solid-state picosecond switch studies" (C. A. Frost, IEEE 2002, pp. 174-177) and "Simulation of semiconductor opening switch physics" (A. Engelko et al., IEEE 2002, pp. 318-321). The semiconductor switch employed in the invention allows its surge-impedance related incorporation into the enclosing excitation circuit. The miniaturized dimensions of the semiconductor switch (approximately 25 mm$^2$ with a height of about 1 mm) also allow the semiconductor switch to be structurally incorporated into the circuit. The efficiency is markedly improved and the construction volume is adapted to today's industry requirements. Generally, several semiconductor switches are integrated into the excitation circuit.

Figure 1:
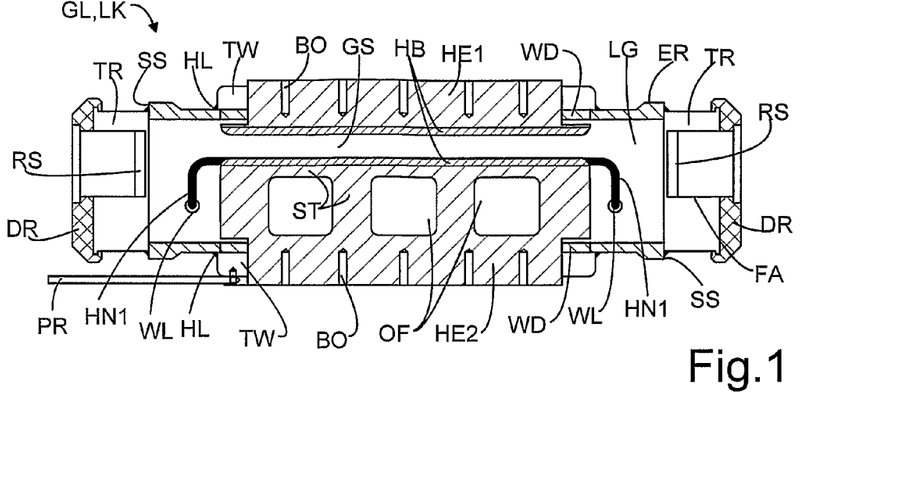
FIG. 1 shows a longitudinal section through the gas discharge laser.
Figure 3:
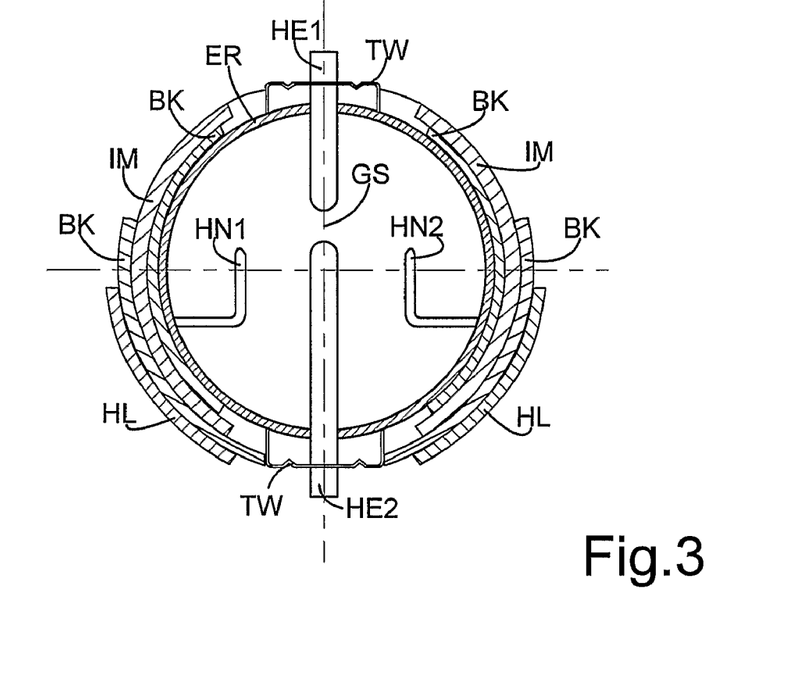
FIG. 3 shows a cross sectional view of the gas discharge laser.
Figure 4:
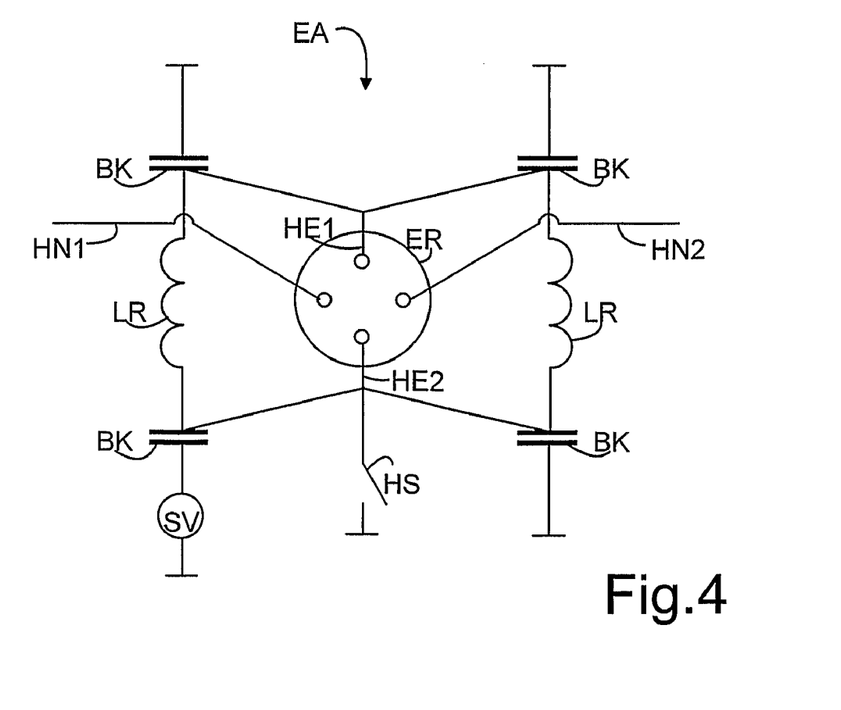
FIG. 4 shows a circuit diagram of the electrical excitation circuit.

FIG. 1 shows a gas discharge laser GL in the area of the laser head LK (without the electrical excitation circuit EA). The laser head LK comprises a gas-tight discharge tube ER made of ceramic and having a cylindrical geometry, containing a sealed-off filling of laser gas LG. In order to evacuate and fill the discharge tube ER, a pump tube PR is provided that is removed once the gas discharge laser GL is in its finished state, whereby the opening is welded or soldered gas-tight. Furthermore, the discharge tube ER contains two main electrodes HE1, HE2 extending axially and situated diametrically opposite from each other, forming a gas discharge path GS between them. By means of two rod-shaped auxiliary electrodes HN1, HN2 (only one auxiliary electrode HN1 is depicted in the longitudinal sectional view) arranged to the side of the main electrodes HE1, HE2, the starting conditions for the gas discharge are controlled through electronic pre-ionization. The electrical excitation circuit EA is shown in FIGS. 3 and 4. In an axial orientation relative to the gas discharge path GS at both ends SS of the discharge tube ER, there are resonator mirrors RS that, in the selected embodiment, are made of sapphire (and consequently can be heated to more than 355° C.—the second water boundary) and are partially or completely mirrored. For the light out-coupling, one resonator mirror RS is configured so as to be partially permeable.

The two main electrodes HE1, HE2 are mounted in elongated wall passages WD in support trays TW that concurrently mechanically decouple the main electrodes HE1, HE2 vis-à-vis the discharge tube ER. Here, through the selection of the material, the support trays are configured to be deformable, so that they allow final adjustment of the main electrodes HE1, HE2 in the finished state. The fine adjustment—for instance, after a change in the length brought about by the heating procedure—can be done either through permanent plastic deformation of the support trays TW or else through elastic deformation, which is maintained in the adjusted state, for example, by a support bracket. The same applies to deformable support rings TR in which the two resonator mirrors RS are arranged, so that these can likewise undergo fine adjustment in the final state, a procedure carried out by means of slotted pressure rings DR. The support trays TW and the support rings TR are connected by adhesive force by molten hard solder to metal layers MB that had been previously partially applied onto the discharge tube ER, creating a practically single-piece laser head LK that is outstandingly gas-tight. The single-piece approach is also retained in the area of the resonator mirrors RS since they are welded gas-tight into the support rings TR via their frames FA.

In order to generate a homogenous and uniform gas discharge in the gas discharge path GS, the two main electrodes HE1, HE2 may be configured asymmetrically and blade-like. In the shown embodiment, the main electrode HE1 is narrower than the main electrode HE2, so that the gas discharge path GS lies above the central axis of the discharge tube ER. The main electrode HE2 has square openings OF with rounded edges, whereby the remaining webs ST have a constant width. The sides of main electrodes HE1, HE2 facing the gas discharge path GS have a high-melting coating HB that prevents metal evaporation due to current pinch-offs and intercalation of gas molecules. On their side that is accessible from the outside, the main electrodes HE1, HE2 have several bores BO that serve to contact the electrical excitation circuit EA.

At the height of the upper edge of the main electrode HE2 facing the gas discharge path GS, the two rod-shaped or wire-shaped auxiliary electrodes HN1, HN2 (see FIG. 3) are each affixed to two support pins TS (see FIGS. 2 and 3) that are arranged as decoupling and holding elements in wall passages WL of the discharge tube ER. The support pins TS are also connected gas-tight to corresponding partial metal layers MB (see FIGS. 2 and 3) on the discharge tube ER by means of molten hard solder.

Figure 2:
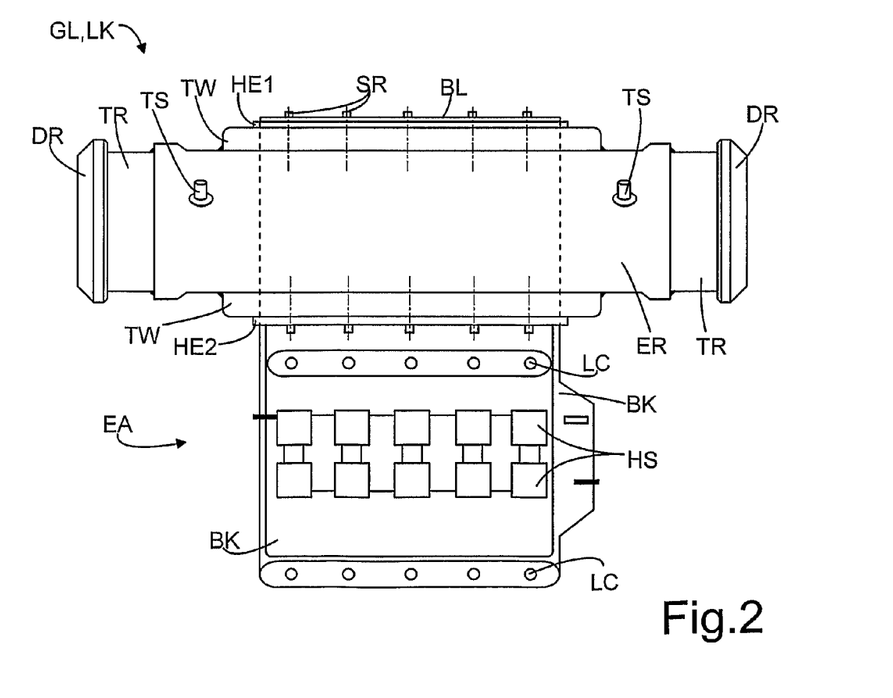
FIG. 2 shows a side view of the gas discharge laser.

FIG. 2 shows a side view of the gas discharge laser GL with the electrical discharge circuit EA in the halfway dropped-down state (the part that is positioned behind the discharge tube ER is indicated by a broken line in FIG. 2), the reference numerals are the same as in FIG. 1. A strip conductor BL with integrated strip conductor capacitors BK and semiconductor switches HS is depicted in the shown embodiment. The contact to the main electrodes HE1, HE2 is established by screwed connections whereby the screws SR extend through holes LC and engage in the bores BO of the main electrodes HE1, HE2. The auxiliary electrodes HN1, HN2 are contacted directly via the support pins TS.

FIG. 3 shows the gas discharge laser according to FIG. 2 in a cross sectional view, with the coaxially closed electrical excitation circuit EA. The electrically insulating discharge tube ER, the two main electrodes HE1, HE2, the auxiliary electrodes HN1, HN2 with the support trays TW, the strip conductor capacitors BK with insulating and mass interlayers IM as well as the semiconductor switch HS can all be seen in this figure. In this context, the strip conductor capacitors BK are arranged in such a way that their current paths are diametrically opposed so that the inductivities compensate for each other, except for a negligible residual inductivity LR.

FIG. 4 schematically shows the electrical circuit diagram of an embodiment of the coaxial electrical excitation circuit EA. By way of an example, four strip conductor capacitors BK and a semiconductor switch HS are shown to represent all of the corresponding components. The electrical energy is provided by a voltage supply SV. The performance data of the semiconductor switch HS can be as follows:

| | |
|---|---|
| operating voltage (switching voltage) | 12,000 V to 18,000 V |
| safe reverse voltage | UB +15% |
| turn-on time | 12 ns to 14 ns |
| reverse recovery time | max. 5 ms |
| jitter time | max. 1.5 ns, optimally 600 ps |
| repeat rate | 100 pps to 250 pps |
| peak current (250 ns) | 1800 A to 5500 A |
| reverse current (200 ns) | 40% of peak current |
| current rise | greater than 120 A ns$^{-1}$ |

Following the comprehensive explanations of the construction of the gas discharge laser, an exemplary method for its production may be carried out as follows, in an embodiment of the invention:

Process Step I

Partial metal layers MB are applied onto the outside of the discharge tube ER and the various support components are subsequently firmly soldered onto said layers.

Process Step II

The deformable support rings TR that serve to hold the optical resonator mirrors RS are placed into each end SS of the discharge tube ER, with interposed hard solder rings.

Process Step III

The deformable support trays TW are placed into each wall passage WD of the discharge tube EA, with interposed hard solder films. These serve as decoupling and holding elements for the main electrodes HE1, HE2 which, in turn, are placed into the support trays TW, with interposed hard solder rings.

Process Step IV

Support pins TS that serve as decoupling and holding elements for the rod-shaped auxiliary electrodes HN1, HN2 are placed into specially provided wall holes WL of the discharge tube ER, with interposed hard solder sleeves. The auxiliary electrodes HN1, HN2, in turn, are slipped onto the support pins TS, with interposed hard solder sleeves.

Process Step V

All of the components that were previously contacted with each other due to the interposed hard solder are passed through a soldering oven. At a soldering temperature above 900° C., the components that are pressed against each other are then hard-soldered together (support trays TW, support rings TR and support pins TS are hard-soldered to the corresponding partial metal layers MB onto the discharge tube ER, the main electrodes HE1, HE2 are hard-soldered to the support trays TW, the auxiliary electrodes HN1, HN2 are hard-soldered to the support pins TS and the support rings TR are hard-soldered to the front ends of the discharge tube ER).

Process Step VI

The frames FA of the mirrored optical resonator mirrors RS are welded gas-tight into the two support rings TR. Here, a material that allows heating up above 355° C. is chosen for the resonator mirrors RS.

Process Step VII

Using the pump tube PR, the discharge tube ER is evacuated until it reaches the ultrahigh vacuum range. At the same time, the discharge tube ER is heated up to a temperature (355° C.) above the second water boundary in order to remove water from the discharge tube ER without leaving any residue.

Process Step VIII

The discharge tube ER is filled via the pump tube PR with the laser and buffer gas that determines the wavelengths. Subsequently, the pump tube PR is sealed gas-tight (welded).

Process Step IX

Pressure rings DR are affixed onto the soldered-in support rings TR that are welded to the resonator mirrors RS. These pressure rings DR have, for instance, screws that serve to exert pressure onto the deformable support rings TR.

Process Step X

This is followed by a fine adjustment via the support trays TW and the support rings TR. These can be affixed permanently plastically or elastically so that they can recover. The deformation takes place, for example, via stationary brackets in the case of the main electrodes HE1, HE2 and via the screws of the pressure rings DR in the case of the resonator mirrors RS.

Process Step XI

Finally, the electrical excitation circuit EA is mounted onto the discharge tube ER and electrically contacted with the main and auxiliary electrodes HE1, HE2, HN1, HN2. In this context, the electrical excitation circuit EA can be installed as a Blümlein circuit by integrating strip conductor capacitors BK into a strip conductor BL that is contacted as shown in FIG. 2, or else by direct application onto other partial metal layers MB coaxially in such a way that their current paths are diametrically opposed in the strip conductor capacitors BK on the outside of the discharge tube ER. The miniaturized, directly switching semiconductor switches HS are contacted between the strip conductor capacitors BK on the strip conductor BL or else directly on the discharge tube ER. After the contact is established with the electrical excitation circuit EA, the gas discharge laser GL is arranged in a housing, the mounting is completed and the laser is then ready for use after being connected to the voltage supply SV.

| List of reference numerals | |
|---|---|
| BL | strip conductor |
| BK | strip conductor capacitor |
| BO | bore |
| EA | electrical excitation circuit |
| ER | discharge tube |
| FA | frame |
| DR | pressure ring |
| GL | gas discharge laser |
| GS | gas discharge path |
| HB | high-melting coating |
| HE | main electrode |
| HL | hard solder |
| HN | auxiliary electrode |
| HS | semiconductor switch |
| IM | insulating and mass interlayer |
| LC | hole |
| LG | filling of laser gas |
| LK | laser head |
| LR | residual inductivity |
| MB | metal layer |
| OF | opening |
| PR | pump tube |
| RS | resonator mirror |
| SR | screw |
| SS | front end |
| ST | web |
| SV | voltage source |
| TR | support ring |
| TS | support pin |
| TW | support tray |
| WD | wall passage |
| WL | wall hole |

The invention claimed is:

1. A transversally electrically excited gas discharge laser for generating light pulses with a high pulse repetition rate, the gas discharge laser including components, the components comprising:
   a gas-tight discharge tube having diametrically opposed wall passages and front ends, the discharge tube having a laser gas sealingly disposed therein and including a ceramic material;
   partial metal layers disposed on the discharge tube;
   decoupling and holding elements including support trays, the decoupling and holding elements being disposed in the diametrically opposed wall passages, and the support trays being adhered to a circumference of the discharge tube via the partial metal layers with hard solder;
   a pair of main electrodes extending axially and being disposed in the decoupling and holding elements so as to form a gas discharge path in the discharge tube;
   a pair of rod-shaped auxiliary electrodes disposed in the discharge tube substantially parallel to the main electrodes and operable to control the starting conditions of gas discharge by electronic pre-ionization;
   at least one energy storage device;
   an electrical excitation circuit operable to act on the main and auxiliary electrodes, the electrical excitation circuit including a switch operable to generate a fast high-current discharge from the energy storage device;
   support rings joined to the front ends of the discharge tube; and
   a pair of optical resonator mirrors welded into the support rings and disposed on the front ends of the discharge tube in an axial orientation relative to the gas discharge path,
   wherein a first of the optical resonator mirrors is partially permeable so as to provide light outcoupling,
   wherein at least some of the components are usable with an ultrahigh vacuum and heatable to above a second water boundary, and
   wherein the support trays and the support rings are deformable so as to enable fine adjustment of the main electrodes and of the resonator mirrors.

2. The transversally electrically excited gas discharge laser as recited in claim 1, wherein at least one of the main electrodes is blade-like.

3. The transversally electrically excited gas discharge laser as recited in claim 1, wherein at least one of the main electrodes includes adjacent openings surrounded by webs having a constant width.

4. The transversally electrically excited gas discharge laser as recited in claim 3, wherein first components of the components are disposed in the openings for active gas circulation.

5. The transversally electrically excited gas discharge laser as recited in claim 1, wherein the main electrodes have different heights and the gas discharge path is disposed outside of a longitudinal axis of the discharge tube.

6. The transversally electrically excited gas discharge laser as recited in claim 1, wherein the main electrodes include a high-melting coating in an area of the gas discharge path.

7. The transversally electrically excited gas discharge laser as recited in claim 1, wherein the rod-shaped auxiliary electrodes are affixed to a pair of support pins at a height of an upper edge of a first main electrode of the main electrodes facing the gas discharge path, the support pins being configured as decoupling and holding elements for the rod-shaped auxiliary electrodes and disposed in wall holes in the discharge tube.

8. The transversally electrically excited gas discharge laser as recited in claim 1, wherein the electrical excitation circuit includes a Blümlein circuit with a plurality of strip conductor capacitors, wherein the strip conductor capacitors coaxially enclose the discharge tube such that current paths of the strip conductor capacitors are diametrically opposed, and including at least one miniaturized, directly switching semiconductor switch integrated between the strip conductor capacitors and configured to switch high-current discharge.

9. The transversally electrically excited gas discharge laser as recited in claim 8, wherein the strip conductor capacitors are incorporated in a strip conductor that coaxially encloses the discharge tube and holds the at least one semiconductor switch.

10. The transversally electrically excited gas discharge laser as recited in claim 8, wherein the strip conductor capacitors are directly applied on second partial metal layers on an outside of the discharge tube.

11. The method as recited in claim 10 further comprising disposing components for active gas circulation in openings in at least a first electrode of the main electrodes.

12. The method as recited in claim 10 wherein the evacuating is carried out until an ultrahigh vacuum range is reached.

13. A method for making a transversally electrically excited gas discharge laser for generating light pulses having a high pulse repetition rate, the method comprising:

applying partial metal layers on an outside of a gas-tight discharge tube including a ceramic material and having a laser gas sealingly disposed therein, the partial metal layers being configured to affix components on the outside of the discharge tube;

disposing a deformable support ring into each of front ends of the discharge tube with interposed hard solder rings, each deformable support ring operable to hold a framed and mirrored optical resonator mirror, at least one of the optical resonator mirrors being partially permeable so as to be configured for light outcoupling;

disposing a deformable support tray of a decoupling and holding element into each of diametrically opposed wall passages in the discharge tube with interposed hard solder films, the support trays being operable as decoupling and holding elements for main electrodes;

disposing the main electrodes into the support trays;

providing a pair of rod-shaped auxiliary electrodes;

disposing support pins in wall holes of the discharge tube, the support pins being operable to serve as decoupling and holding elements for the rod-shaped auxiliary electrodes;

disposing the rod-shaped auxiliary electrodes on the support pins;

hard-soldering, in a controlled soldering oven, the:
  support rings, the support trays and the support pins to corresponding partial metal layers of the discharge tube,
  main electrodes to the support trays, and
  rod-shaped auxiliary electrodes to the support pins, the rod-shaped auxiliary electrodes extending parallel to the main electrodes so as to control starting conditions for the gas discharge through electronic pre-ionization;

gas tight welding the framed and mirrored optical resonating mirrors into the support rings in an axial orientation relative to a gas discharge path of the discharge tube, the framed and mirrored optical resonating mirrors being able to withstand temperatures above a second water boundary;

evacuating the discharge tube to an ultrahigh vacuum range using a pump tube and simultaneously heating the discharge tube to a temperature above the second water boundary;

filling the discharge tube with laser and buffer gas using the pump tube;

removing the pump tube and subsequently gas-tight sealing an opening of the pump tube;

fixing pressure rings onto the support rings;

finely adjusting the main electrodes and resonator mirrors by at least one of plastic or fixed elastic deformation of the support trays and support rings; and installing an electrical excitation circuit and connecting the electrical excitation circuit with the main and auxiliary electrodes, the electrical excitation circuit being operable to act on the main electrodes and auxiliary electrodes and including a switch operable to generate a fast high-current discharge from an energy storage device.

14. The method as recited in claim 13, wherein the hard soldering is carried out at a temperature above 900° C.

15. The method as recited in claim 14, wherein the electrical excitation circuit includes a Blümlein circuit, and wherein the installing the electrical excitation circuit includes:

integrating strip conductor capacitors into a strip conductor and installing the electrical excitation circuit such that current paths are diametrically opposed in the strip conductor capacitors on the outside of the discharge tube; and disposing the switch between the strip conductor capacitors on the strip conductor, the switch including at least one miniaturized directly switching semiconductor.

16. The method as recited in claim 14, wherein the electrical excitation circuit includes a Blümlein circuit, and wherein the installing the electrical excitation circuit includes:

installing strip conductor capacitors coaxially onto partial metal layers such that current paths are diametrically opposed in the strip conductor capacitors on the outside of the discharge tube; and disposing the switch between the strip conductor capacitors on the discharge tube, the switch including at least one miniaturized directly switching semiconductor.

17. The method as recited in claim 14 further comprising disposing components for active gas circulation in openings in at least a first electrode of the main electrodes.

18. The method as recited in claim 13, wherein the electrical excitation circuit includes a Blümlein circuit, and wherein the installing the electrical excitation circuit includes:

integrating strip conductor capacitors into a strip conductor and installing the electrical excitation circuit such that current paths are diametrically opposed in the strip conductor capacitors on the outside of the discharge tube; and disposing the switch between the strip conductor capacitors on the strip conductor, the switch including at least one miniaturized directly switching semiconductor.

19. The method as recited in claim 13, wherein the electrical excitation circuit includes a Blümlein circuit, and wherein the installing the electrical excitation circuit includes:

installing strip conductor capacitors coaxially onto partial metal layers such that current paths are diametrically opposed in the strip conductor capacitors on the outside of the discharge tube; and disposing the switch between the strip conductor capacitors on the discharge tube, the switch including at least one miniaturized directly switching semiconductor.

20. The method as recited in claim 13 further comprising disposing components for active gas circulation in openings in at least a first electrode of the main electrodes.

* * * * *